(12) United States Patent
Lecciso et al.

(10) Patent No.: US 10,616,273 B2
(45) Date of Patent: Apr. 7, 2020

(54) METHOD FOR IDENTIFYING POTENTIALLY FRAUDULENT USAGE OF A USER IDENTIFIER

(71) Applicant: International Business Machines Corporation, Armonk, NY (US)

(72) Inventors: Francesco Lecciso, Rome (IT); Emiliano Nuccilli, Rome (IT); Elia Tufarolo, Tarquinia (IT); Ivonne Elizabeth Vereau Tolino, Rome (IT)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 15/428,368

(22) Filed: Feb. 9, 2017

(65) Prior Publication Data
US 2018/0227328 A1    Aug. 9, 2018

(51) Int. Cl.
*H04L 29/06*    (2006.01)
*H04L 29/12*    (2006.01)
(Continued)

(52) U.S. Cl.
CPC .......... *H04L 63/1483* (2013.01); *H04L 51/04* (2013.01); *H04L 61/1594* (2013.01); *H04W 4/02* (2013.01); *H04W 12/1206* (2019.01); *H04W 12/00503* (2019.01); *H04W 12/00514* (2019.01); *H04W 12/12* (2013.01)

(58) Field of Classification Search
CPC . H04L 63/1483; H04L 51/04; H04L 61/1594; H04W 4/02; H04W 12/12
See application file for complete search history.

(56) References Cited

U.S. PATENT DOCUMENTS 7,035,865 B2 * 4/2006 Doss ................... G06Q 10/109
7,660,795 B2    2/2010 Barrett et al.
(Continued)

FOREIGN PATENT DOCUMENTS

WO    2013140410 A1    9/2013

OTHER PUBLICATIONS

Malcolm Corney et al., Detection of Anomalies from User Profiles Generated from System Logs, AISC '11 Proceedings of the Ninth Australasian Information Security Conference—vol. 116, pp. 23-32, Perth, Australia—Jan. 17-20, 2011 http://crpit.com/confpapers/CRPITV116Corney.pdf.

*Primary Examiner* — Chau Le
(74) *Attorney, Agent, or Firm* — Terrile, Cannatti & Chambers, LLP; Stephen A. Terrile (57) ABSTRACT

The present disclosure relates to a computer implemented method for identifying potentially fraudulent usage of a user identifier of an information or communication service. The method comprises: receiving from a user device at least one address book entry related to a person. The address book entry includes the user identifier. The address book entry may be stored. Behavior information about the person's behavior when using at least one service in combination with the user identifier may be received from the user device. It may be determined based on a change of the behavior information whether or not the user identifier has been assigned to a different person and, if so, a warning indication may be generated for indicating that the user identifier is potentially used fraudulently.

16 Claims, 4 Drawing Sheets

(51) Int. Cl.
  *H04L 12/58* (2006.01)
  *H04W 4/02* (2018.01)
  *H04W 12/12* (2009.01)
  *H04W 12/00* (2009.01)

(56) References Cited

U.S. PATENT DOCUMENTS

| | | |
|---|---|---|
| 8,214,899 B2 | 7/2012 | Chien |
| 8,892,461 B2 | 11/2014 | Lau et al. |
| 8,932,368 B2* | 1/2015 | Fitzgerald ............ H04W 12/12 455/411 |
| 9,215,244 B2* | 12/2015 | Ayyagari ............ H04W 12/06 |
| 9,753,796 B2* | 9/2017 | Mahaffey ............ G06F 11/0766 |
| 9,847,973 B1* | 12/2017 | Jakobsson ............ H04L 63/0245 |
| 10,116,650 B2* | 10/2018 | Delong ............ H04W 4/21 |
| 2004/0128353 A1* | 7/2004 | Goodman ............ H04L 51/04 709/204 |
| 2006/0287764 A1 | 12/2006 | Kraft |
| 2009/0280777 A1* | 11/2009 | Doherty ............ H04M 1/66 455/411 |
| 2014/0189019 A1* | 7/2014 | Hudack ............ H04L 67/306 709/206 |
| 2014/0282977 A1* | 9/2014 | Madhu ............ H04L 63/1483 726/7 |
| 2015/0026786 A1* | 1/2015 | Alexander ............ H04L 63/1408 726/7 |
| 2015/0082448 A1* | 3/2015 | Elovici ............ G06Q 10/107 726/26 |
| 2015/0156163 A1* | 6/2015 | Ratnakar ............ H04M 1/274516 455/414.1 |
| 2015/0381562 A1* | 12/2015 | Efrati ............ H04L 61/1594 455/415 |
| 2016/0065570 A1* | 3/2016 | Spencer, III ............ G06Q 20/40 726/7 |
| 2017/0068906 A1* | 3/2017 | Korycki ............ G06N 99/005 |
| 2018/0091453 A1* | 3/2018 | Jakobsson ............ H04L 51/12 |
| 2019/0028430 A1* | 1/2019 | Luo ............ H04L 29/08 |

* cited by examiner

METHOD FOR IDENTIFYING POTENTIALLY FRAUDULENT USAGE OF A USER IDENTIFIER

BACKGROUND

The present invention relates to the field of digital computer systems, and more specifically, to a method for identifying potentially fraudulent usage of a user identifier of an information or communication service.

Nowadays, most of instant messaging applications use the phone number as the primary key to uniquely identify a contact. Sometimes it happens that users change their phone number and their original phone card is not reset, but reassigned to a different account. Current instant messaging applications are not able to properly handle this scenario and report the old account as still associated to the original contact. Users already having that contact in their phone address book have no evidence of the above condition. This may lead those users to share personal information to unauthorized people. In addition, users could provide fake identities to other users.

SUMMARY

Various embodiments provide a method for identifying potentially fraudulent usage of a user identifier of an information or communication service, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for identifying potentially fraudulent usage of a user identifier of an information or communication service. The method comprises: receiving from a user device at least one address book entry related to a person, the address book entry including the user identifier; storing the address book entry; receiving from the user device behavior information about the person's behavior when using at least one service (at least one information or communication service) in combination with the user identifier; and determining based on a change of the behavior information whether or not the user identifier has been assigned to a different person and, if so, generating a warning indication for indicating that the user identifier is potentially used fraudulently.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system (or service system) for identifying potentially fraudulent usage of a user identifier of an information or communication service. The method comprises: receiving from a user device at least one address book entry related to a person, the address book entry including the user identifier; storing the address book entry; receiving from the user device behavior information about the person's behavior when using at least one service in combination with the user identifier; and determining based on a change of the behavior information whether or not the user identifier has been assigned to a different person and, if so, generating a warning indication for indicating that the user identifier is potentially used fraudulently.

BRIEF DESCRIPTION OF THE SEVERAL VIEWS OF THE DRAWINGS

In the following embodiments of the invention which are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described. embodiments. The terminology used herein was chosen to best explain the principles of the embodiments, the practical application or technical improvement over technologies found in the marketplace, or to enable others of ordinary skill in the art to understand the embodiments disclosed herein.

The present disclosure may provide a mobile social network platform or social media able to detect improper usage of a user identity through the leverage of user data. The present method may be based on the fact that users grant access to their phone address book. In order to take advantage of a service that is able to identify potential fake identities, users are for example requested to upload their phone address book to a main server. Proper privacy statements can guarantee users that their personal data will be treated with discretion and security. Other information related to the user will also be acquired periodically, such as geo-location (leveraging GPS, WiFi and mobile cell to which the phone is connected), most contacted users and timestamps of transmitted messages. Uploaded data is periodically compared to identify discrepancies in name and surname fields associated to each phone number. The server will be able to reconcile name and surname of accounts, considering trivial mistakes, variations, nicknames, diminutives, etc., and based on other information that may be available on users' address books (e.g. accounts in Skype, Facebook, LinkedIn, etc.). Moreover, the server will process saved data about geo-location and most contacted users in order to find sudden changes of the habit of a certain user: for instance, if the user location is changed in an unexpected manner and new users are contacted and older users aren't, the user that is using the account assigned to a certain phone number has changed. All these values are used to calculate a feedback value for a determined user: if the feedback value does not pass a specific threshold value, the server deduces that the user/person is changed. For name identifications that the server is not able to resolve, an alert message is sent to the accounts that own the address book, including the potential fraudulent account. Users receiving the notification will be allowed to ignore the alert, if they trust the account identity, or delete it. The server will learn from users' feedback, assigning a positive or negative feedback to the implicated user identity. A user can decide to change his user identifier ID (mobile phone number) by releasing his current ID and registering the new ID to the server. This way, all references that associate the old ID to the user are deleted from the server.

The present method may enable a secure communication method through information or communication service. It may for example prevent sending sensitive information to fraudulent users of the user identifier. If, for example, two persons are usually communicating via skype from their respective laptops, each having a respective IP address, the present method may enable to determine if one of the two IP addresses is assigned or used fraudulently by a third person.

For example, additional information may be stored in association with the address book entry in order to enhance the content associated with the user identifier. The additional information relates to the user identifier. The additional information may for example comprise social media account information of the user identifier.

According to one embodiment, the user identifier comprises a phone number. This may be particularly advantageous for instant messaging applications where each person may have a very long list of contacts that may be impossible to track by hand. This embodiment may also provide a secure communication in cellular telecommunication systems by detecting misuses of mobile phones for crimes, etc. The user identifier may be a unique identifier.

According to one embodiment, the behavior information comprises contact information describing frequently used contacts.

According to one embodiment, the behavior information comprises geographic location information describing the geographic location of the person. This embodiment may make use of global positioning receivers such as a GPS receiver; DIPS receiver; GNSS receiver; GLONASS receiver; or BeiDou receiver for determining the positioning of the user device.

According to one embodiment, the user device being a mobile phone, wherein the behavior information comprises wireless networks to which the mobile phone connected.

These embodiments may be advantageous as they may provide an accurate method for detecting fraudulent uses of the user identifier. This may increase the reliability of the present method.

According to one embodiment, the method comprises receiving a change request from a user device and modifying the stored address book entry by replacing a user identifier included therein, based on the change request. This may enable assigning the right user identifier to the address book entry and may thus avoid the repeated submissions of the warning messages.

According to one embodiment, the method further comprises receiving from the user device personal information indicative of the person, comparing at least part of the received personal information with predefined reference personal data associated with the user identifier, wherein the determining whether or not the user identifier has been assigned to a different person is further based on the comparison result. This may further increase the accuracy and the reliability of the present method by limiting the warning signals only after performing multiple checks. The personal information may for example be received as part of the behavior information or may be received separately from the behavior information, e.g., from the same user device and/or from a difference source. The predefined reference personal data may comprise a portion of the received personal information. For example, the personal information may comprise the social media account information associated with the user identifier e.g., the Facebook profile associated with the user identifier and the Twitter profile associated with the user identifier. In this example, the comparison may be made between the Facebook profile and the Twitter profile to determine whether or not the user identifier has been assigned to a different person. In another example, the predefined reference personal data may be the address book entry and/or the additional information stored in association with the address book entry.

According to one embodiment, the address book entry further includes another user identifier of another person, the method further comprising receiving from the user device personal information indicative of the person and other person, comparing the received personal information with predefined data associated with the user identifier and the other user identifier, wherein the determining whether or not the user identifier has been assigned to a different person is further based on the comparison result. This may further increase the accuracy and the reliability of the present method by limiting the warning signals only after performing further checks. The comparison of the results obtained for each of the user identifiers (e.g., taking one as reference) may further help determining whether the user identifier has been assigned to a different person.

According to one embodiment, the change of the behavior information is determined by comparing at least part of the received behavior information with the predefined reference personal data and/or with predefined reference behavior data, the method further comprising scoring each comparison result, comparing each of the scores with respective predefined thresholds, and combining the results of the scores comparisons for determining whether or not the user identifier has been assigned to a different person. This may enable a controllable and systematic check of the fraudulent usage of the user identifier. The predefined reference behavior data may for example comprise historical behavior information related to the user identifier received in previous time periods. In another example, predefined reference behavior data may comprise a portion of the received behavior information e.g., the received behavior information is cross checked against each other.

According to one embodiment, the thresholds are location and/or time dependent thresholds. For example, during vacation time, the threshold may be set differently than normal periods, as the behavior information of the same person may change in the vacation period compared to normal periods.

According to one embodiment, the generating of the warning indication for indicating that the user identifier is potentially used fraudulently further comprises sending the warning indication to other user identifiers being associated with the user identifier. For example, the warning indication may comprise an instant message that is sent to phones of all persons listed as contacts of the person. In another example, the warning indication may he published in a public location e.g., a web site) accessible by other users.

According to one embodiment, the receiving from the user device of the behavior information is performed on a predefined periodic basis. For example, the user device may be configured to send the behavior information every month or every week. The submission of the behavior information may automatically be performed by the user device or may be performed upon receiving a request from a server system that receives the behavior information.

According to one embodiment, the person to whom the at least one address book entry relates is an owner of another user device having the user identifier, the other user device being adapted for communication with the user device. The owner of the user device being different from the person. For example, the user device is owned by user A, and the user identifier that is indicated in the address book entry is of the person B, different from user A. The other user device is owned by person B. Thus, the way person B communicates with user A may be tracked at user A device. Based on the tracking, a misuse of the other user device can be determined. For example, person B writes an SMS at least twice a day to user A. In case user A does not receive any more any messages from person B, this is an indication that something may be wrong with the other user device of person B. This may further enforce the secure communication through the information or communication service, as a third party (user A) different from the person (B) having the user identifier is involved in the decision process.

According to one embodiment, the method further comprises repeating the steps of receiving, storing, and receiving for multiple user devices, resulting in respective multiple address book entries and multiple behavior information all related to the user identifier, wherein the determining whether or not the user identifier has been assigned to a different person is further based on a change in at least part of the multiple behavior information. This may provide a reliable result by comparing multiple sources before deciding whether or not the user identifier has been assigned to a different person.

Figure 1:
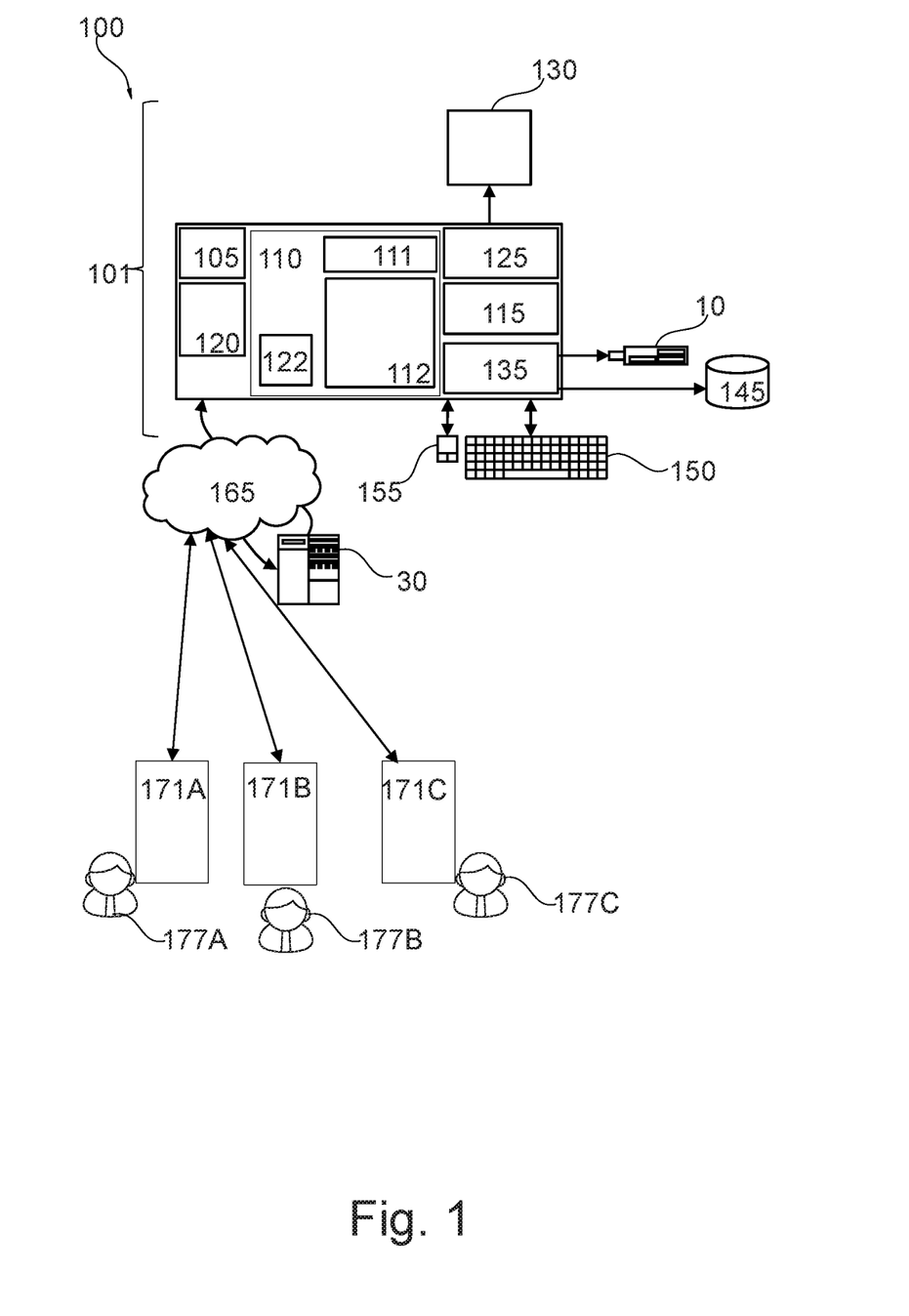
FIG. 1 represents a computerized system, suited for implementing one or more method steps as involved in the present disclosure.

FIG. 1 represents a general computerized system or a server system 100, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112. 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112, e.g., instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 be performed. When a source program, then the program needs to he translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

One or more user devices 171A-C may connect to the server system 100 via network 165. For simplicity of the description, only three user devices are shown in FIG. 1; however, more or less user devices can be used. A user device 171A-C may for example be a handheld communication device that can be held by a respective user or person 177A-C. The person 177A-C may be the owner of the respective user device 171A-C. User device 171A-C may, for example, be a mobile phone, tablet, palmtop, laptop, notebook, PDA (personal digital assistant), or other mobile computer device which is connectable to network 165.

The user devices 171A-C may be configured to communicate with each other via a communication or information service such as WhatsApp.

Figure 2:
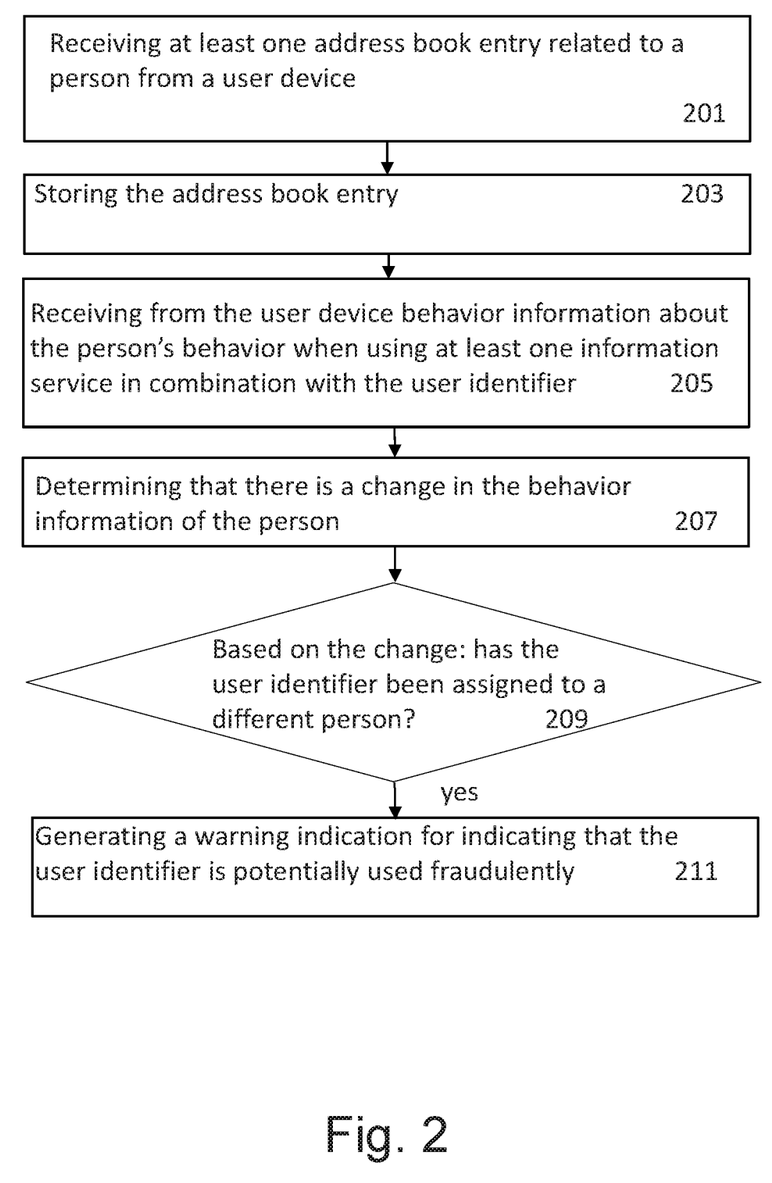
FIG. 2 is a flowchart of an example method for identifying potentially fraudulent usage of a user identifier of an information or communication service.

FIG. 2 is a flowchart of a method for identifying potentially fraudulent usage of a user identifier of an information or communication service. The user identifier may for example comprise a phone number, an IP address, an IMEI code and the ICCID code of a SIM card. The fraudulent usage of the user identifier may be an identity fraud, wherein identity fraud refers to an act where one person uses another person's personal data, without authorization, to deceive or defraud someone else. For example, it is identity fraud to use someone's mobile phone to contact other private or legal persons.

The information or communication service may for example comprise an instant messaging service such as WhatsApp, Skype, Viber etc. In another example, information or communication service may comprise a cellular telecommunication system such as LTE system that is provided as communication service by a given operator.

In step 201, at least one address book entry related to a person may he received from a user device e.g., 171A by the server system 100. The address book entry includes the user identifier. The reception of the address book entry may be automatic or may be performed in response to a request received by the user device 171 from the server system 100.

The person to whom the at least one address book entry relates may or may not be the owner of the user device 171A e.g., he may be a contact person of the owner of the user device 171. For example, the address book entry may be received from user device 171A owned by person 177A and the address book entry may relate to another person, e.g., 177B.

The user device 171 may comprise as described above a mobile phone, PDA, laptop, or other device that can use the user identifier with the information or communication service, etc.

Step 201 may comprise receiving (e.g., at the server system 100) an address book comprising the at least one address book entry from the user device 171A. The at least one address book entry may comprise personal information indicative of the person 177A owner of the user identifier. The personal information may for example comprise at least one of: the name of the person, e-mail address of the person, and social networks (or social media) accounts identifiers.

Step 201 may further comprise receiving from other user devices respective address book entries, wherein each of the received address book entries includes the user identifier.

Social media (or social network) are computer-mediated technologies that allow the creating and sharing of information, ideas, problems, career interests and other forms of expression via virtual communities and networks. Social media may refer to a web-site on which one or more users may post content related to social interaction on a web-site. Content generally refers to images, videos, comments or other text, date information, identification data, links, user profiles, or other data or information that may be posted or otherwise accessible on or from the social media site(s). Examples of social media websites are Facebook, WhatsApp, Tumblr, Instagram, Twitter, Baidu Tieba, Pinterest, LinkedIn, Gab, Google+, YouTube, Viber, Snapchat, Weibo, WeChat, and blogs.

Social media may provide API access to the data to support requests from the server system 100. The interaction of the server system 100 with social media can be done for example using BOTs technology. This interaction may for example enable collection of additional information related to the user identifier such as Facebook profile data associated with the user identifier. The additional information may be stored in association with the address book entry of the user identifier. In one example, the additional information may further indicate behavior information of the person 177A.

The information contained in or associated with the received address book entry may comprise information that is collected during a first time period. The first time period may start at the time of receiving the address book entry or may start at another point in time before or after receiving the address book entry.

In step 203, the address book entry may be stored at the server system 100. In one example, the address book entry may be stored as a record in a data structure (e.g., list L) that is associated with the person 177A to whom the address book entry relates. A time stamp may be added indicating the time at which the address book entry is received at the server system 100. The data structure may be newly created if the address book entry is the first record or entry to be received and associated with the person 177A in the server system 100; otherwise, the address book entry may be added to existing entries of the data structure. The additional information may be stored in association with the address book entry e.g., in the data structure or in another structure that is linked to the respective address book entry.

In step 205, behavior information about the person's behavior when using at least one information service in combination with the user identifier may be received from the user device 171A. The reception of the behavior information may be automatically performed or may be performed in response to a request of the behavior information e.g., the request may be sent by the server system.

For example, the behavior information comprises contact information describing frequently used contacts. The behavior information may indicate the number of times the person 177A has contacted a contact person using the user identifier and may further indicate the time at which the contacts have been made. For example, the behavior information may indicate that the person is contacting his mother's phone number every day once.

In case the address book entry relates to a person 177B different from the person 177A owner of the user device 171A, the behavior information may indicate the number of times the person 177B has contacted person 177A using the user identifier and may further indicate the time at which the contacts have been made. In another example, the behavior information may indicate how frequently the person 177B posts instant messages on a communication group created in the communication service WhatsApp).

In another example, the behavior information comprises geographic location information describing the geographic location of the person. The geographical location maybe determined using a GPS module of the user device. The behavior information may indicate the geographic locations in association with the time at which the person was present in that location. For example, the behavior information may indicate the trajectory the person follows in the morning to go to the work and the trajectory the person follows in the evening to go back home.

In another example, in case the user device 171A is a mobile phone, the behavior information comprises wireless networks to which the mobile phone connected. The behavior information may indicate the list of Wi-Fi into which the user device has connected in the last month. The behavior information may for example indicate that the person 177A connects to a given Wi-Fi more than one hour per day.

Step 205 may further comprise receiving personal information indicating e.g., the name, surname social media identifiers, etc., and social media information related to the user identifier.

The received behavior information (and the personal information) may be collected in a predefined second time period. The second time period may be after the first time period. The received behavior information may be the current behavior information related to the person 177A.

The server system 100 may further comprise previous behavior information for the user identifier that are previously received from the user device 171A and/or other sources such as the additional information described above. The previous behavior information may be comprised in the data structure that is stored in association with the person 177A. The data structure comprises records or entries corresponding to received address book entries for the person 177A.

In step 207, it may be determined that there is a change in the behavior information of the person using the received behavior information. At least part of the received behavior information may for example be compared in step 207 with reference behavior information of the person in order to detect the change. The reference behavior information may for example be collected from the user device 171A (or from other sources) in previous time periods, e.g., the reference information comprises the previous behavior information. In another example, the reference behavior information may comprise a portion of the received behavior information. For example, the received behavior information may comprise the frequency of contacts of the person 177A with his or her three collaborators or colleagues. In a normal situation, the frequency of the contacts may be similar with three colleagues. Thus, by comparing against each other received contact frequencies, it may be determined if there is a change in the behavior or not.

In one example, step 207 may further comprise comparing the received personal information with the reference personal information to determine for example if the name of the person 177A has changed, etc. In this case, the comparison may consider trivial mistakes, variations, nicknames, diminutives, etc. This may for example be done using a spell checker and/or corrector tool. For example, the comparison may be performed after correcting spelling errors.

It may be determined in inquiry 209 based at least on the change of the behavior information whether or not the user identifier has been assigned to a different person. The inquiry 209 may further be based on the change in the personal information.

For example, the amount of the change may be compared to a predefined threshold (e.g., as described in FIG. 4), and if the amount of the change is higher than the predefined threshold, this may be an indication that the user identifier has been assigned to a different person. For example, if the mobile device of the person has been stolen by another person, the behavior information of the another person such as the trajectories (as exemplified above) performed per day by the another person may be completely different from the trajectories that are performed by the person.

In another example, if the amount of the change is higher than the predefined threshold, the personal information, such as name of the person, may further be compared with the personal information in the data structure. And, if in addition, the result of the comparison indicates that the user identifier has been assigned to a different person, it may be determined that the user identifier has been assigned to a different person. This provides two kinds of checks that are combined to determine if the user identifier has been assigned to a different person.

In case it has been determined that the user identifier has been assigned to a different person, a warning indication may be generated in step 211 for indicating that the user identifier is potentially used fraudulently. The warning indication may for example be sent to all contacts associated with the user identifier in the server system. The contacts associated with the user identifier may be the user devices which are the senders of the address book entries that are stored in the data structure associated with the person 177A.

In case it has been determined that the user identifier has not been assigned to a different person, the received behavior information may be stored in the server e.g., such that it can be further used as part of the reference behavior information if the method is repeated.

Steps 205-211 may be repeated on a predefined periodic basis e.g., every month or every year, etc. This may enable a continuous monitoring of the fraudulent usage of the user identifier.

Figure 3:
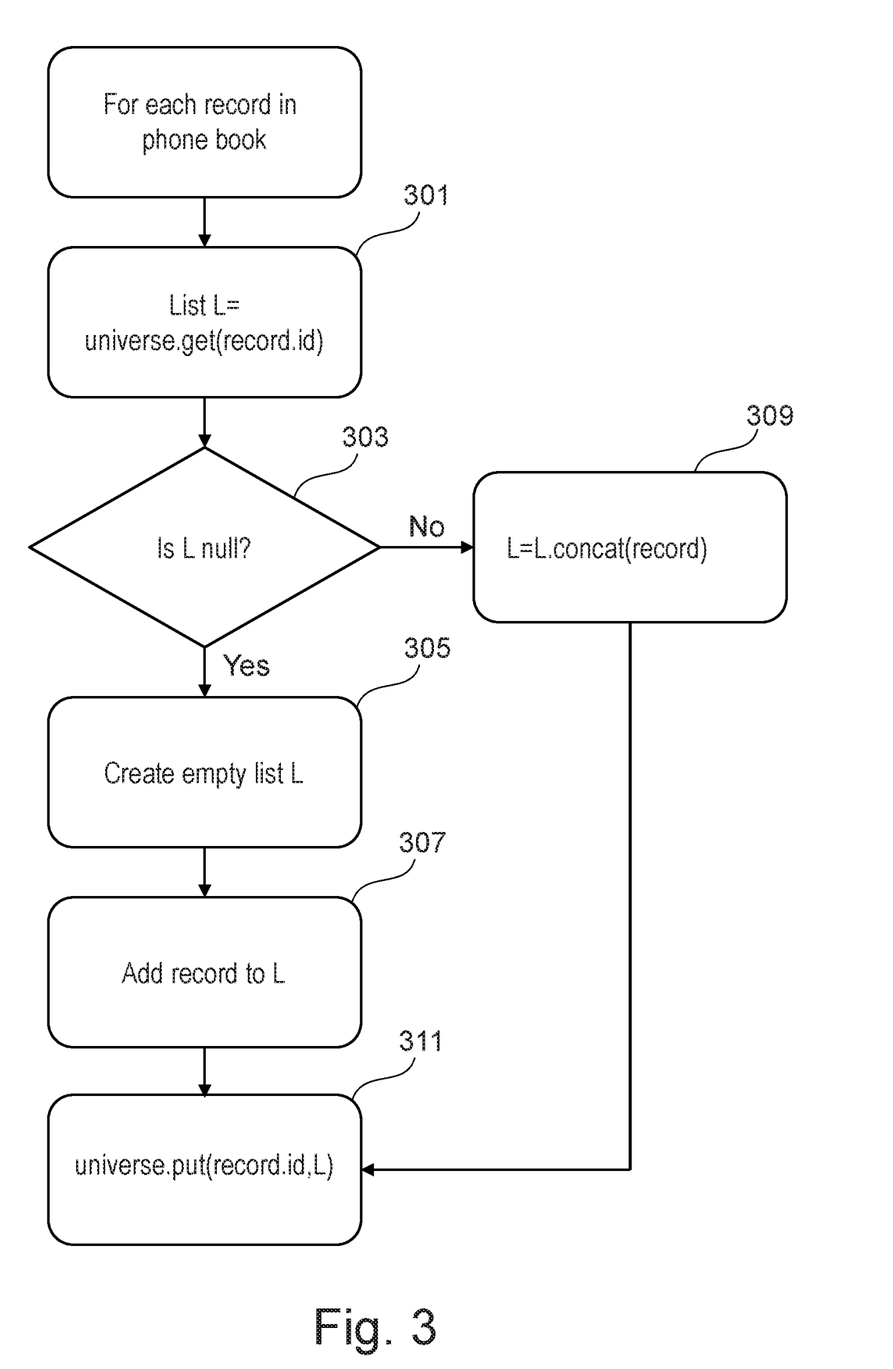
FIG. 3 is flowchart of a method for storing an address book in a server system.

FIG. 3 is flowchart of a method for storing entries of an address book in the server system 100. The address book may for example be a phone book. The steps of FIG. 3 may be performed for each record of the address book (and e.g., for further address books). A record or entry of the address book may comprise data related to a respective phone number. For example, if the address book comprises 5 phones numbers, each phone number in the address book may be associated with personal information related to the phone number such as name, surname of the owner of the identifier. The personal information and the phone number may be stored as an entry or record of the address book.

In step 301, upon receiving the address book, the server system 100 may request (e.g., using function universe.get) for an identifier (record.id) of a current record of the address book a list L of information, wherein the list L comprises personal information or data related to the identifier of the record. The identifier may be a user identifier such as a phone number of a user device.

In case (inquiry 303) the received list L is NULL or in case an error message is received in response to the request of step 301, steps 305-307 and 311 may be performed. The list L being NULL or the reception of the error message may indicate that there is no information in the server system 100 that is related to the identifier.

In step 305, an empty list L may be created and the current record may be added to the list in step 307. The resulting list L is then stored in the server system 100, e.g., in storage 120. In this case, the list L may comprise a record that has the information of the processed current record of the address book.

In case (inquiry 303) the received list L is not NULL which means that there is one or more records of information related to the identifier of the current record stored in the server system 100 in the form of list L, steps 309 and 311 may be performed.

In step 309, the received list L is updated with the information contained in the current record (as indicated by function L.contact) by adding a new record to the list L, and the updated list L is stored in the server system 100 in step 311.

The content of the list L may be further enhanced by processing the information in the list L and/or by collecting other information related to the user identifier from one or more sources of information. For example, the information of the list L may be processed to determine frequently used contacts by the user device. The determined frequently used contacts may further be stored in the list L in step 307 or step 309. In another example, the geographical locations of the user device may be collected (e.g., using a GPS receiver). The geographical location information may for example be collected during a predefined first time period. In one example, the predefined first time period ends at the time of creating the list L in step 305, or ends at the time of updating the list L in step 309, is stored in the list L. In another example, the predefined first time period may end after the time of creating the list L or after the time of updating the list L. For the update case, the predefined first time period may start upon storing the list L or at the last time the list L is updated. For the created list case, the predefined first time period may start at a time before the storage of the new created list L. The geographical location information may further be stored in the record of the list L that is added to the list L in step 307 or step 309. In another example, additional information related to the user identifier may be retrieved from social media and may further be stored in association with the list L.

Furthermore, each record added to the list L may further indicate the user or the source (e.g., phone number) of the address book. For example, the address book received in step 301 may be received from a user X, wherein the user X has a respective user identifier X. The received address book may comprise records related to user identifier X as well as other user identifiers (contacts of user X).

Steps 301-311 may be repeated for each record of the address book and for further received address books. This may result in a list L for the user identifier that comprises multiple records associated with respective user devices, and the additional information collected for the user identifier. For example, for a phone number XX, the list L contains all records processed by the server related to that phone number XX, for all the registered phone books. The following are three records of the list L related to the phone number 3391234567: 3391234567—Robert Birch∥ 3391234567— Bob Birch, bob.birch@mail.com∥ 3391234567—Bobby Birch, robert.birch@facebook.com. Each record may represent the respective received address book entry which may for example comprise a name, email address and/or social media account.

Figure 4:
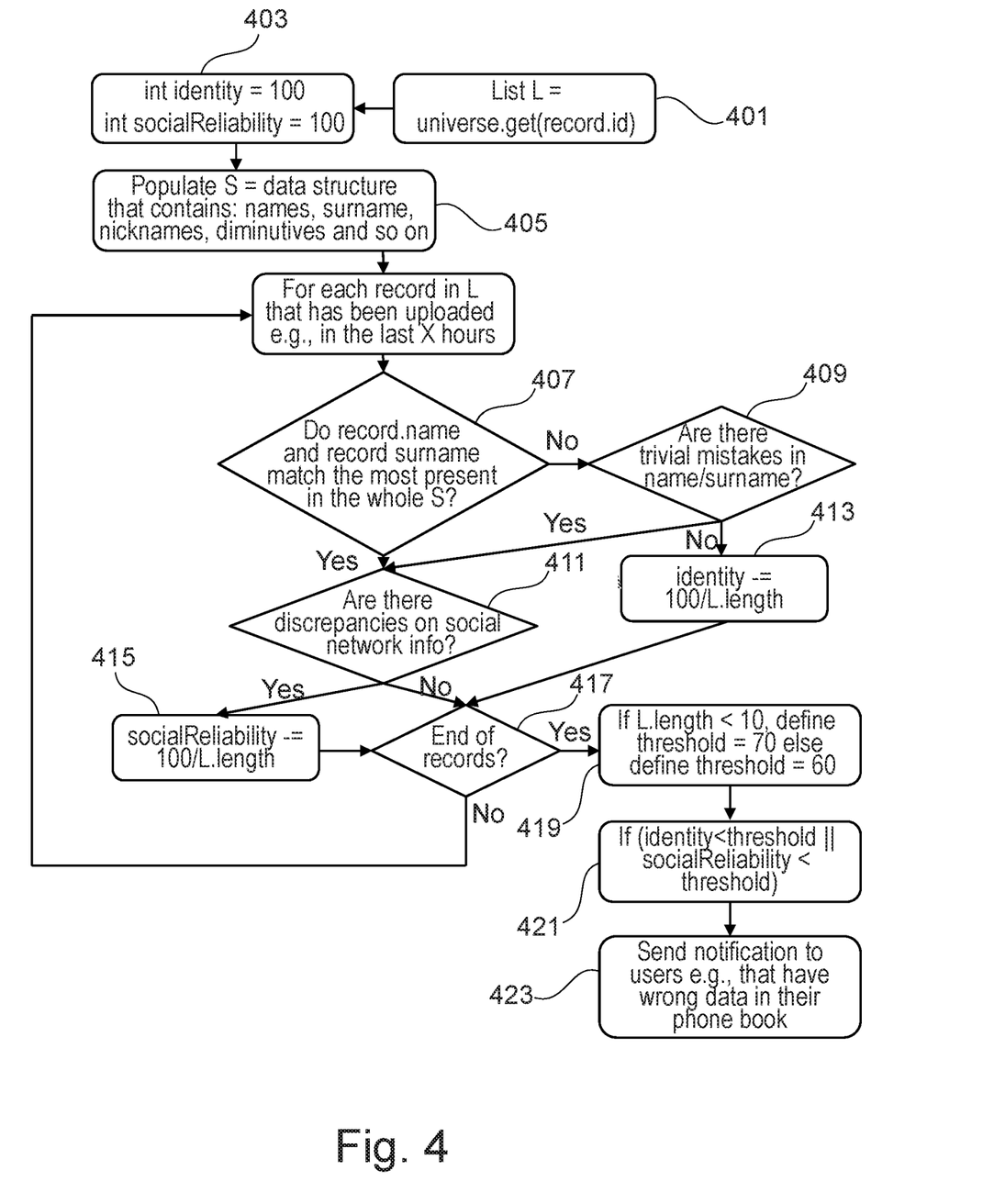
FIG. 4 is flowchart of another method for identifying potentially fraudulent usage of a user identifier of an information or communication service.

FIG. 4 is flowchart of another method for identifying potentially fraudulent usage of a given user identifier (record.id) of an information or communication service. The server system comprises information on the user identifier. The user identifier may for example be a phone number.

In step 401, the server system 100 may request (e.g., using function universe.get) for the given user identifier (record.id) a list L of information, wherein the list L comprises personal information or data related to the given user identifier.

In step 403, a first score and a second score may be created and initialized to predefined values by the server system 100. In the example of FIG. 4, the first score "identity" is initialized to 100, and the second score is initialized to 100.

In step 405, the server system 100 may generate a data structure S (or data S) that contains information related to the given user identifier. The information may for example be gathered or collected from different sources of data related to the user identifier such as social media. The collection of information of step 405 may, for example, be performed using the same collection method and data sources used to enhance the content of the list L as described above with reference to FIG. 3. The collection of information related to the given user identifier may be performed in a second time period. The second time period may follow or be after the first time period (as describe in FIG. 3). In another example, the second time period may comprise the first time period (e.g., last X hours) and additional time following the first time period. For example, the first time period may be the last month (e.g., May) in which the list L has been created, and the second time period may be the following month (e.g., June).

The collected information may for example comprise social network accounts, variations, nicknames, diminutives of the given user identifier, etc. The generated data structure may comprise one or more records. For example, each record may be created for a respective source of data. For example, if the collected information of the given user identifier is requested from Facebook, a record may be created for the received information. And if additional information of the given user identifier is further requested from Twitter, another record may be created for the received information.

For each record of the list L steps 407-417 may be performed.

A first part of the information in a current record of the list L may be compared with the information of the generated data structure S. The first part of information may for example comprise the name and surname of the given user identifier. It may be determined (inquiry 407) whether the first part of information is present in the data structure S or does not match the major part of entries contained in the data structure S. For example, if the data structure comprises 10 time references to the name of the given user identifier as collected from respective sources e.g., Facebook name, Twitter name for the given user identifier. If the name indicated in the first part of information matches x % of the names, where e.g., x>80%, then there is no discrepancy.

If it is determined (inquiry 407) that the first part of the information is not present or does not match the major part of entries contained in the data structure S (e.g., Carl Birch entry is analyzed; the data structure S contains: Robert Birch, Bob Birch, Bobby Birch, Carl Birch), it may be checked (inquiry 409) if there are mistakes in the first part of the information. For example it may be determined whether there are spelling errors in the name and the surname of the given user identifier.

In case (inquiry 409) there are no mistakes in the first part of the information, the first score may be decreased in step 413 by a first predefined value. The first predefined value may be 5, or 100/L.length, L.length is the number of records in the list L.

In case (inquiry 407) the first part of the information is present in the data structure S or there are (inquiry 409) mistakes in the first part of the information, it may be checked (inquiry 411) whether there is a discrepancy in a further check involving the data structure S. The further check may for example comprise comparing a second part of the information with the content of the data structure S. The second part of the information may for example comprise the enhanced content associated with the given user identifier in the list L. Alternatively or additionally, the further check of inquiry 411 may use the content of the data structure S only to detect the discrepancy in the data structure S. The discrepancy in this case may, for example, be indicated by the following: References to different Facebook accounts (e.g., 8 occurrences of JohnSmith@facebook.com and 2 occurrences of CarlSmith@facebook.com) in the data structure S. Different social networks provide different job profiles for the same time (e.g., John Smith, according to Facebook, works for Company 1, but according to LinkedIn, works for Company2) in the data structure S. According to Facebook, John Smith has a wife and three children, according to Google+ he's divorced and has no children. Differences similar to previous ones, but related to: religion, age, political ideas, evidence of opposed hobbies and interests (e.g., John Smith's favorite soccer team is Real Madrid per Facebook, Barcelona per Twitter) etc.

In case (inquiry 411) there is a discrepancy in the second part of the information of the list L compared to the information of the current record of the data structure 5, the second score may be decreased by a second predefined value in step 415. The second predefined value may be 10, or 100/L.length, L.length is the number of records in list L.

Upon decreasing the first score or decreasing the second score or upon determining that there is no discrepancy in the check of the second part of the information of the list L, it may be determined (inquiry 417) if the current record of the data structure is the last record (processed) of the list L. If not, steps 407-417 may be repeated for a further record of the data structures S until all records of data structure S are processed. In another example, upon decreasing the first score, inquiry 411 may be performed. This may enable a cross check of the result of inquiry 407.

In case (inquiry 417) all records of the list L are processed, the resulting first and second scores may be compared in step 421 with respective thresholds, wherein the thresholds are determined in step 419. For example, the thresholds may be determined based on the length of the list L, e.g., if the length of the list L is smaller than 10, the threshold may be 70, otherwise the threshold may be 60. This may take into account the fact that the more records are collected in list L, the high the probability of finding discrepancies and thus the scores may be lower.

In case the comparison determines that the first and/or second score are smaller than the threshold, a notification may be sent in step 423 to users related to the given user identifier e.g., each record in the list L of the user identifier may correspond to a respective contact user. These contact users may be notified in step 423. In other words, users that have the given user identifier as a contact into their phone books are notified about the possibility that the given user identifier might belong to a different person. In another example, these notified users may be users that have wrong data in their phone book related to the given user identifier.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer of entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In sonic embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for identifying potentially fraudulent usage of a user identifier of an information or communication service, the method comprising:
   receiving from a user device at least one address book entry related to a person, the address book entry including the user identifier;
   storing the address book entry;
   receiving from the user device behavior information about the person's behavior when using at least one service in combination with the user identifier; and
   determining based on a change of the behavior information whether or not the user identifier has been assigned to a different person and, if so, generating a warning indication for indicating that the user identifier is potentially used fraudulently; and wherein
   the behavior information comprises contact information describing frequently used contacts and social network information; and,
   the change of the behavior information comprises discrepancies on the social network information, the social network information providing enhanced content associated with the user identifier.

2. The method of claim 1, wherein the user identifier comprises a phone number.

3. The method of claim 1, wherein the behavior information comprises geographic location information describing the geographic location of the person.

4. The method of claim 1, the user device being a mobile phone, wherein the behavior information comprises wireless networks to which the mobile phone is connected.

5. The method of claim 1, wherein the method comprises receiving a change request indicating a replacement user identifier from a second user device and modifying the stored address book entry by replacing the user identifier included therein, using the replacement user identifier.

6. The method of claim 1, further comprising receiving from the user device person information indicative of the person, comparing at least part of the received person information with predefined reference person data associated with the user identifier, wherein the determining whether or not the user identifier has been assigned to a different person is further based on the comparison result.

7. The method of claim 6, wherein the change of the behavior information is determined by comparing at least part of the received behavior information with the predefined reference person data and/or predefined reference behavior data, the method further comprising scoring each comparison result, comparing each of the scores with respective predefined thresholds, and combining the results of the scores for determining whether or not the user identifier has been assigned to a different person.

8. The method of claim 7, the thresholds being location and/or time dependent thresholds.

9. The method of claim 1, the at least one address book entry further including another user identifier of another person, the method further comprising receiving from the user device person information indicative of the person and the other person, comparing the received person information with predefined data associated with the user identifier and the other user identifier, wherein the determining whether or not the user identifier has been assigned to a different person is further based on the comparison result.

10. The method of claim 7, the generating of the warning indication for indicating that the user identifier is potentially used fraudulently further comprises sending the warning indication to other user identifiers being associated with the user identifier.

11. The method of claim 1, the receiving from the user device of the behavior information being performed on a predefined periodic basis.

12. The method of claim 1, further comprising repeating the receiving and the determining steps on a predefined periodic basis.

13. The method of claim 1, the person to whom relates the at least one address book entry is an owner of another user device having the user identifier, the owner of the user device being different from the person, the other user device being adapted for communication with the user device.

14. The method of claim 1, further comprising repeating the steps of receiving, storing, and receiving for multiple user devices, resulting in respective multiple address book entries and multiple behavior information all related to the user identifier, wherein the determining whether or not the user identifier has been assigned to a different person is further based on a change in at least part of the multiple behavior information.

15. A computer system for identifying potentially fraudulent usage of a user identifier of an information or communication service, the computer system being configured for:

receiving from a user device at least one address book entry related to a person, the address book entry including the user identifier;

storing the address book entry;

receiving from the user device behavior information about the person's behavior when using at least one service in combination with the user identifier; and determining based on a change of the behavior information whether or not the user identifier has been assigned to a different person and, if so, generating a warning indication for indicating that the user identifier is potentially used fraudulently; and wherein the behavior information comprises contact information describing frequently used contacts and social network information; and, the change of the behavior information comprises discrepancies on the social network information, the social network information providing enhanced content associated with the user identifier.

16. A non-transitory, computer-readable storage medium embodying computer program code, the computer program code comprising computer executable instructions configured for:

receiving from a user device at least one address book entry related to a person, the address book entry including the user identifier;

storing the address book entry;

receiving from the user device behavior information about the person's behavior when using at least one service in combination with the user identifier; and determining based on a change of the behavior information whether or not the user identifier has been assigned to a different person and, if so, generating a warning indication for indicating that the user identifier is potentially used fraudulently; and wherein the behavior information comprises contact information describing frequently used contacts and social network information; and, the change of the behavior information comprises discrepancies on the social network information, the social network information providing enhanced content associated with the user identifier.

* * * * *